United States Patent
Brinkmoeller et al.

(10) Patent No.: US 7,653,666 B2
(45) Date of Patent: Jan. 26, 2010

(54) METHOD AND COMPUTER SYSTEM FOR IDENTIFYING OBJECTS FOR ARCHIVING

(75) Inventors: Bernhard Brinkmoeller, Wiesloch (DE); Marcus Pfeifer, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 397 days.

(21) Appl. No.: 10/486,086

(22) PCT Filed: Jul. 8, 2002

(86) PCT No.: PCT/EP02/07566

§ 371 (c)(1),
(2), (4) Date: Oct. 18, 2004

(87) PCT Pub. No.: WO03/014968

PCT Pub. Date: Feb. 20, 2003

(65) Prior Publication Data

US 2006/0235906 A1    Oct. 19, 2006

(30) Foreign Application Priority Data

Aug. 7, 2001   (EP) ................... 01119078

(51) Int. Cl.
  *G06F 12/00* (2006.01)
  *G06F 17/30* (2006.01)
(52) U.S. Cl. ........... 707/204; 707/100; 707/103 R; 707/103 X; 707/103 Y; 711/161; 711/162
(58) Field of Classification Search .......... None
See application file for complete search history.

(56) References Cited

U.S. PATENT DOCUMENTS

| | | | | |
|---|---|---|---|---|
| 5,317,728 A * | 5/1994 | Tevis et al. ................ | 707/204 |
| 5,581,755 A | 12/1996 | Koerber et al. ........... | 395/614 |
| 5,630,131 A * | 5/1997 | Palevich et al. .......... | 717/108 |
| 5,764,972 A * | 6/1998 | Crouse et al. .............. | 707/1 |
| 5,875,441 A | 2/1999 | Nakatsuyama .............. | 707/1 |
| 5,920,864 A * | 7/1999 | Zhao ........................ | 707/10 |
| 6,151,024 A * | 11/2000 | Alimpich et al. .......... | 715/854 |
| 6,236,988 B1 | 5/2001 | Aldred ...................... | 707/3 |
| 6,377,956 B1 * | 4/2002 | Hsu et al. ................. | 707/104.1 |
| 6,678,705 B1 * | 1/2004 | Berchtold et al. ......... | 707/204 |
| 6,934,722 B1 * | 8/2005 | Goshey et al. ............ | 707/204 |
| 6,941,325 B1 * | 9/2005 | Benitez et al. ............ | 707/200 |
| 7,117,293 B1 * | 10/2006 | Graziano et al. .......... | 711/100 |
| 7,363,307 B1 * | 4/2008 | Yamagishi et al. ......... | 707/100 |
| 2003/0093434 A1 * | 5/2003 | Stickler ................. | 707/103 R |
| 2003/0093521 A1 * | 5/2003 | Schlonski et al. ......... | 709/224 |
| 2003/0184811 A1 * | 10/2003 | Overton .................... | 358/3.27 |

OTHER PUBLICATIONS

A. Herbst, "Long-Term Database Support for EXPRESS Data," *IEEE*, pp. 207-216, Feb. 1994.

* cited by examiner

*Primary Examiner*—Tim T. Vo
*Assistant Examiner*—Jay A Morrison
(74) *Attorney, Agent, or Firm*—Finnegan, Henderson, Farabow, Garrett & Dunner, LLP (57) ABSTRACT

Methods and computer systems are provided for identifying objects for archiving out of a plurality of objects. A first computer system supplies a plurality of objects for archiving. Each object may have an object type and at least one sub-object. Further, an assignment scheme may be provided, which assigns a plurality of sub-object types to the object type. A computer program may identify at least one sub-object for archiving with the object by using the assignment scheme. A second computer system may receive data for archiving from the first computer system. The data may comprise the object and the at least one sub-object that are identified by the first computer system for archiving. The second computer system may store the data.

18 Claims, 4 Drawing Sheets

METHOD AND COMPUTER SYSTEM FOR IDENTIFYING OBJECTS FOR ARCHIVING

This application is a national stage filing under 35 U.S.C. § 371 of International Application No. PCT/EP02/07566, filed Jul. 8, 2002 which published in the English language.

FIELD OF THE INVENTION

The present invention generally relates to electronic data processing, and more particularly, relates to methods, computer program products and systems for data archiving.

BACKGROUND OF THE INVENTION

In prior art systems, such as Enterprise Resource Planning (ERP) systems (e.g. SAP R/3 from SAP AG) the archiving of data is achieved by providing an archiving program for each different type of data. Typically, the data that are subject to archiving are documents, such as a financial document (e.g. an accounting voucher) or a purchasing document, where items purchased from a certain vendor are listed. Another example of data that can be a subject to archiving is a database table.

In the latest prior art systems (e.g. SAP Customer Relationship Management) documents are objects that comprise sub-objects. Each object has a defined object type (e.g. purchasing document, invoice, accounting voucher, etc.). Each sub-object has a defined sub-object type (e.g. business partner, note, product, etc.). An object type includes a specific subset of sub-object types. For example, a purchasing document object comprises sub-objects of type business partner (e.g. address data of a supplier) and of type product (e.g. the line items of the purchasing document). An accounting voucher object would not comprise a product sub-object, because product information has no relevance in financial accounting. However, the accounting voucher object could comprise a business partner sub-object with the bank account of a supplier. Therefore, an assignment scheme defines assignments of sub-object types to object types. One sub-object type can be assigned to multiple object types. New object types can thus be created by composing a new subset of sub-object types.

Typically, each object/sub-object type has a unique data structure and the corresponding archiving program has to reflect this unique data structure to archive all data within the object. Whenever the data structure of an object/sub-object type is modified (e.g. a table is added to or removed from an object/sub-object), the corresponding archiving program does not take into account the modifications unless it is manually adjusted to the new data structure of the modified object/sub-object type. Without this adjustment some data within an object/sub-object of the modified object/sub-object type are not subject to archiving. Complex application systems, such as ERP systems, support a large number of different object/sub-object types, which makes it difficult to keep the data structures of the object/sub-object types consistent with the corresponding archiving programs.

SUMMARY OF THE INVENTION

Hence, the present invention provides computer-implemented methods, computer program products and computer systems to solve the technical problem of inconsistencies between the data structure of objects/sub-objects that are subject to archiving and the corresponding archiving programs.

According to a first preferred embodiment of the present invention, a solution to the technical problem may be provided by the following characteristics:

A first inventive computer-implemented method on an application computer for identifying objects (e.g. application objects) for archiving comprises the steps:

a) supplying a plurality of objects, wherein an object for archiving has an object type and has at least one sub-object;

b) providing an assignment scheme that assigns a plurality of sub-object types to the object type; and c) identifying the at least one sub-object for archiving with the object, wherein the at least one sub-object has a sub-object type that is assigned to the object type of the object.

The first inventive computer-implemented method may be complemented by a second inventive computer-implemented method on an archiving computer for archiving the objects that are identified in the first method. The second method may comprise the steps of:

a) receiving data for archiving, wherein the data comprise a first portion for an object having an object type and a second portion for at least one sub-object having a sub-object type. The sub-object is assigned to the object, wherein the assignment is identified by an assignment scheme that assigns the sub-object type to the object type, respectively.

b) archiving the data, wherein archiving means storing in a memory of the archiving computer.

A further preferred embodiment of the invention is implemented as first and second computer program products. The first computer program product has a plurality of instructions for causing a processor of the application computer to execute the steps of the first method to identify objects for archiving. The second computer program product has a plurality of instructions for causing a processor of the archiving computer to execute the steps of the second method to archive the objects that are identified by the first computer program product. The first and second computer program products can be stored on a first and second data carrier, respectively.

An advantage of the present invention is the combination of the enhanced flexibility in defining object types by composing subsets of sub-object types with the improved system control for assuring the completeness of archived objects. The first method may identify all sub-objects for archiving that belong to an object on the application computer by collecting all sub-objects that have a sub-object type which is assigned to the object type of the object in the assignment scheme. If a new sub-object type gets assigned to the object type, the inventive first method may automatically consider all sub-objects having the new sub-object type for archiving. The second method completes the archiving process.

A further advantage of the present invention is the independence of archiving programs from object/sub-object data structures. Therefore, the need for manual adjustments to archiving programs after the modification of the data structure of a corresponding object/sub-object type is eliminated. The first computer program product may take advantage of the object oriented nature of the documents. The first computer program product can handle any object having an object type where sub-object types are assigned to in the assignment scheme. Any addition, modification or removal of sub-objects in the assignment scheme may be immediately considered by the first computer program product without any modification, because all sub-objects are identified on the base of sub-object type-to-object type assignments. The second computer program product completes the archiving process on the archiving computer.

The aspects of the invention will be realized and attained by means of the elements and combinations particularly pointed

DETAILED DESCRIPTION OF THE INVENTION

Wherever possible, the same reference numbers will be used throughout the drawings to refer to the same or like parts. For convenience of explanation a list of references is provided prior to the claims.

Figure 1:
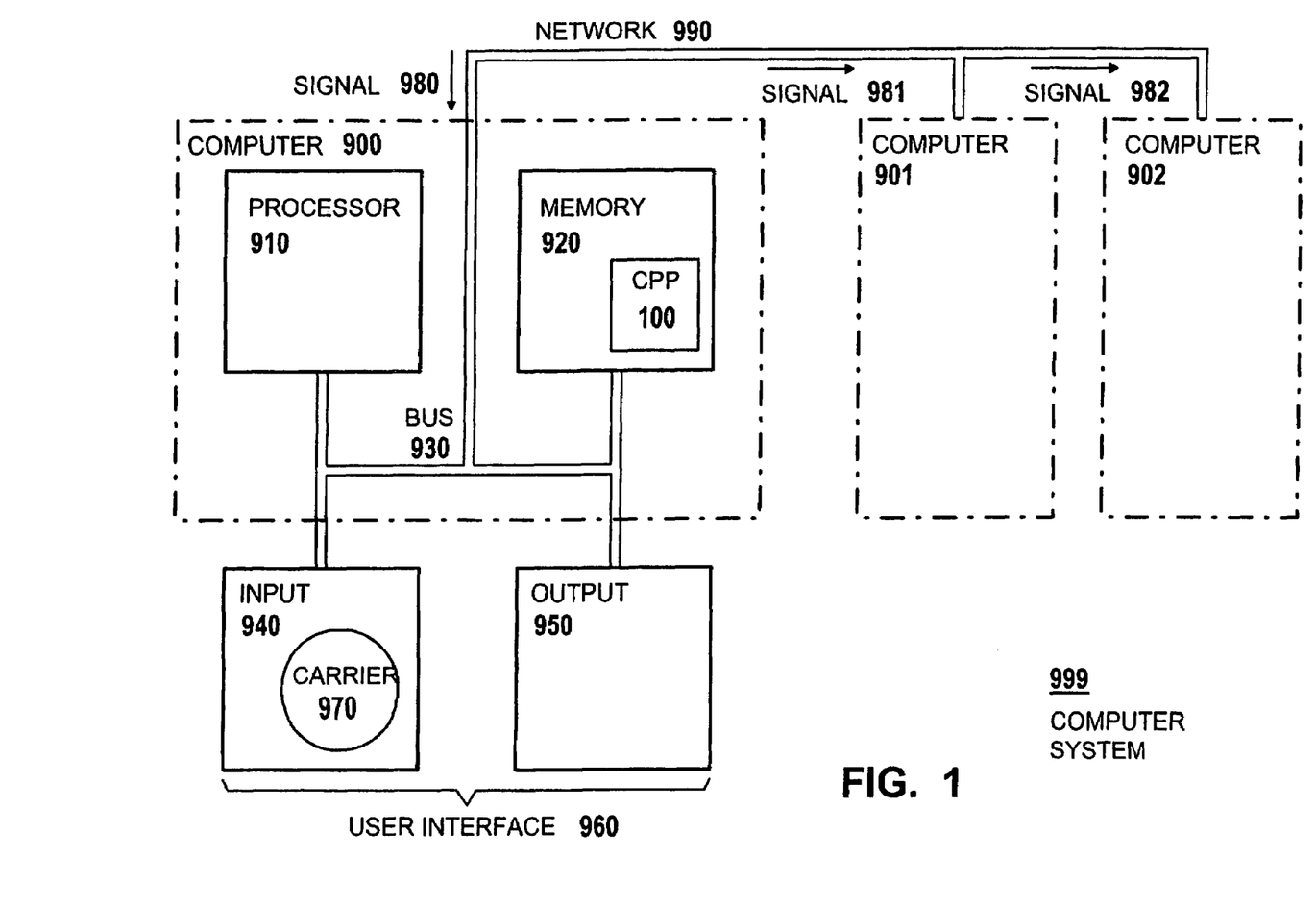
FIG. 1 illustrates a block diagram of an exemplary implementation of the inventive computer network system.

FIG. 1 illustrates a block diagram of an exemplary implementation of the inventive computer network system 999 having a plurality of computers 900, 901, 902 (or 90$q$, with q=0...Q-1, Q any number).

Computers 900-902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program."

In respect to computer 900, computer 901/902 is sometimes referred to as "remote computer," computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930, " connections between computers 900-902 are referred to as "network 990." Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the Internet (i.e. World Wide Web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN), an Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computers and programs are closely related. As used hereinafter, phrases, such as "the computer provides" and "the program provides," are convenient abbreviations to express actions by a computer that may be controlled by a program. Furthermore, the term "prreferably" is nonexclusive and means "preferably, but not limited to."

Figure 2:
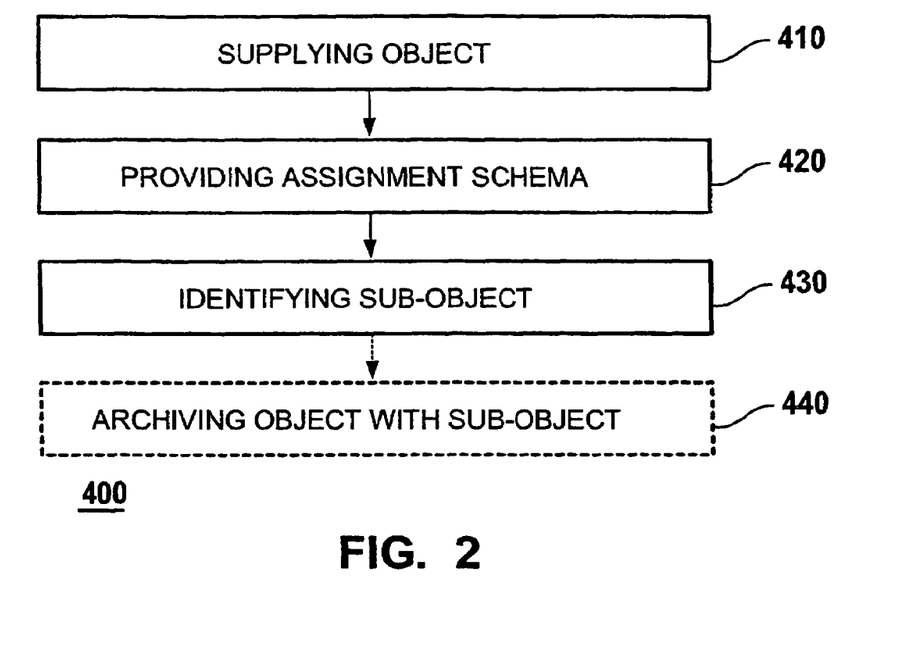
FIG. 2 illustrates a first method for identifying objects for archiving according to an exemplary implementation of the present invention.

FIG. 2 illustrates a first method 400 for identifying objects for archiving according to exemplary implementation of the present invention.

As used herein, objects are illustrated by icons with different shapes, wherein the shape of the icon (e.g. circle, hexagon, square) indicates the object type.

Figure 4:
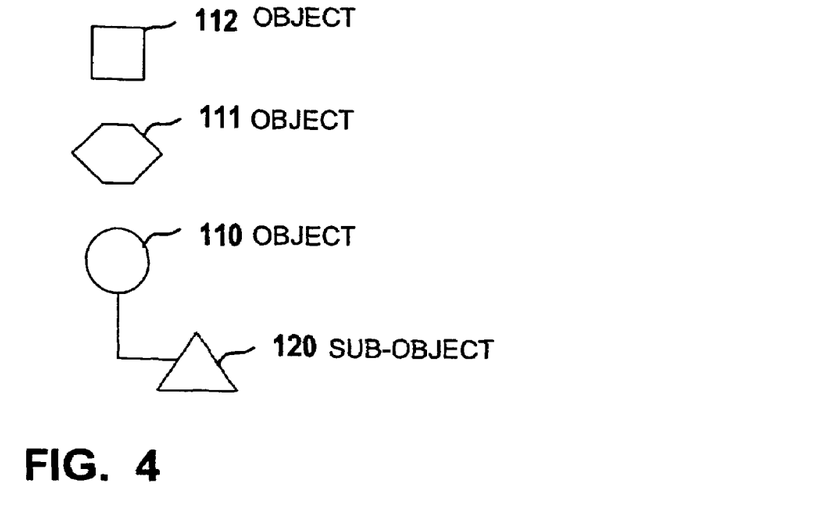
FIG. 4 illustrates objects having different object types.

Method 400 May Comprise the Following Steps a) supplying 410 a plurality of objects 110, 111, 112 (cf. FIG. 4), wherein object 110 for archiving has object type 130 (cf. FIG. 5) and has at least one sub-object 120 (cf. FIG. 4);

b) providing 420 an assignment scheme 190 (cf. FIG. 5) that assigns a plurality of sub-object types 140, 141, 142 (cf. FIG. 5) to object type 130; and c) identifying 430 the at least one sub-object 120 for archiving with object 110, wherein the at least one sub-object 120 has sub-object type 140 that is assigned to object type 130 of object 110.

Optionally (dashed lines), method 400 comprises the further step d) archiving 440 the at least one sub-object 120 with object 110.

The method steps are now explained in detail.

In the supplying step 410, application computer 900 (cf. FIG. 7) may provide the plurality of objects 110, 111, 112 that are subject to archiving. For example, an object for archiving is flagged with a corresponding archiving attribute. Typically, objects 110, 111, 112 are created by application programs (not shown) that run on application computer 900. In the example, object 110 has object type 130 (illustrated by a circle) and has at least one sub-object 120.

In the providing step 420, application computer 900, may provide assignment scheme 190. Preferably, assignment scheme 190 may be implemented as an assignment table (cf. table 3) in memory 920 (cf. FIG. 7) of application computer 900. A person of skill in the art can implement the assignment scheme in a different embodiment, such as an assignment program, at a different storage location in computer network system 999 (cf. FIG. 1). Assignment scheme 190 may assign a plurality of sub-object types 140, 141, 142 (cf. FIG. 5) to object type 130. As a consequence, object 110 having object type 130 can comprise sub-objects (e.g., 120) of any of the assigned sub-object types 140-142 (e.g., 140 illustrated as up-triangle).

TABLE 1

| assignment scheme 190 | |
|---|---|
| Object Type | Sub-Object Type |
| 130 | 140 |
| 130 | 141 |
| 130 | 142 |
| ... | ... |

In the identifying step 430, application computer 900 may identify all sub-objects (e.g., 120) of object 110 that are subject to archiving. This is achieved by a computer program that looks up all sub-object types 140, 141, 142 which are assigned to object type 130 of object 110 in assignment scheme 190. Then, the program automatically knows the data structure of object 110 and of all sub-objects (e.g., 120) that can be assigned to object 110. The program may identify all sub-objects (e.g., 120) of object 110 that are subject to archiving by comparing the corresponding sub-object types to the sub-object types 140-142 in the assignment scheme. An advantage is that one computer program can be used for the identification of all sub-objects of any object type, because the computer program learns, while executing, about the data structures of the sub-objects through the corresponding sub-object types.

In the optional archiving step 440 object 110 with all its sub-objects (e.g. 120) is stored. Preferably, object 110 and its sub-objects are stored in memory 921 (cf. FIG. 7) of archiving computer 901 (cf. FIG. 7). In case that the objects for archiving are identified and archived on the same computer, they can also be stored on application computer 900.

As disclosed herein, an advantage of the present invention is that the archiving of all sub-objects with a corresponding object is guaranteed. However, the present invention can also be used for applications, where partial archiving of an object is desired. In this case, application scheme 190 may be extended by an attribute that indicates sub-object types that are subject to archiving versus sub-object types not to be considered for archiving. Table 2 illustrates an example of extended assignment scheme 190. The "Archiving attribute column" comprises a flag that indicates that sub-object type 140 is a subject to archiving, whereas sub-object types 141, 142 are not.

TABLE 2 extended assignment scheme 190

| Object Type | Sub-Object Type | Archiving attribute |
|---|---|---|
| 130 | 140 | yes |
| 130 | 141 | no |
| 130 | 142 | no |
| ... | ... | |

Figure 3:
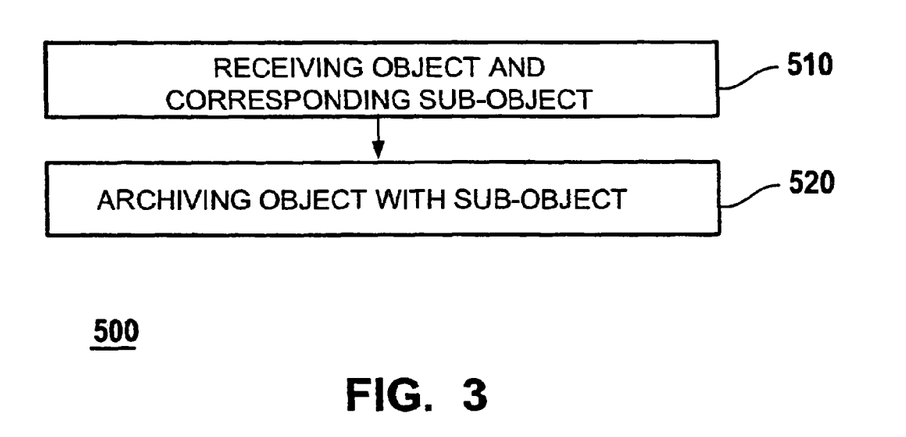
FIG. 3 illustrates a second method for archiving objects according to an exemplary implementation of the present invention.

FIG. 3 illustrates an exemplary implementation of second method 500 for archiving objects according to the present invention. Second method 500 may complement first method 400 by storing the identified objects and sub-objects in archiving computer 901. Preferably, second method 500 is executed after identifying step 430 of method 400. Method 500 may comprise the following steps a) receiving 510 data 160 (cf. FIG. 6) for archiving, wherein data 160 comprise a first portion 161 (cf. FIG. 6) for object 110 having object type 130 and a second portion 162 (cf. FIG. 6) for at least one sub-object 120 having sub-object type 140. Sub-object 120 is assigned to object 110, wherein the assignment is identified by using assignment scheme 190 that assigns sub-object type 140 to object type 130, respectively; and b) archiving 520 data 160.

The steps are now explained in detail.

Figure 7:
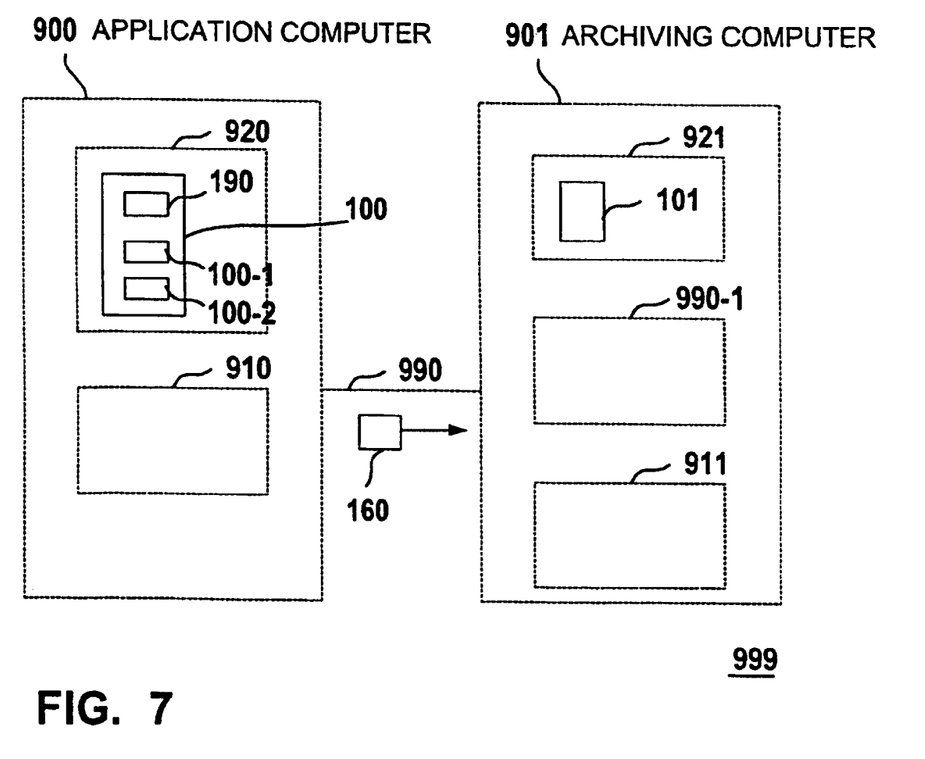
FIG. 7 illustrates an exemplary implementation of an inventive application computer with an exemplary implementation of an inventive archiving computer.

In the receiving step 510, preferably, archiving computer 901 may receive data 160 from application computer 900 via network 990 (cf. FIG. 7). Data 160 may comprise first portion 161 and second portion 162. First portion 161 includes object 110, which is subject to archiving and has object type 130. Second portion 162 includes all sub-objects of object 110 that are identified by application computer 900 according to the identifying step 430 of method 400 (cf. FIG. 2).

In the archiving step 520, preferably, archiving computer 901 stores data 160 in memory 921. Optionally, data 160 can be stored at any storage location of computer network system 999 (cf. FIG. 1).

FIG. 4 illustrates objects having different object types.

For example, objects 110, 111, 112 are subject to archiving. Each object has a different object type. The object type characterizes the different nature of the objects. For example, object 110 has object type 130 (cf. FIG. 5, circle) that can correspond to a document, such as a purchasing document, where items purchased from a certain vendor are listed. Object types of objects 111, 112 can represent documents, such as a financial document (e.g. an accounting voucher) or a sales document. Each object comprises at least one sub-object. For convenience of explanation, this is illustrated for object 110, only.

Object 110 comprises sub-object 120. Each sub-object has a defined sub-object type (e.g. business partner, note, product, etc.). In case of object 110 being a purchasing document, sub-object 120 having object type 140 (cf. FIG. 5), for example, refers to a line item that includes product data. An object can have multiple sub-objects of the same or of different object types.

Figure 5:
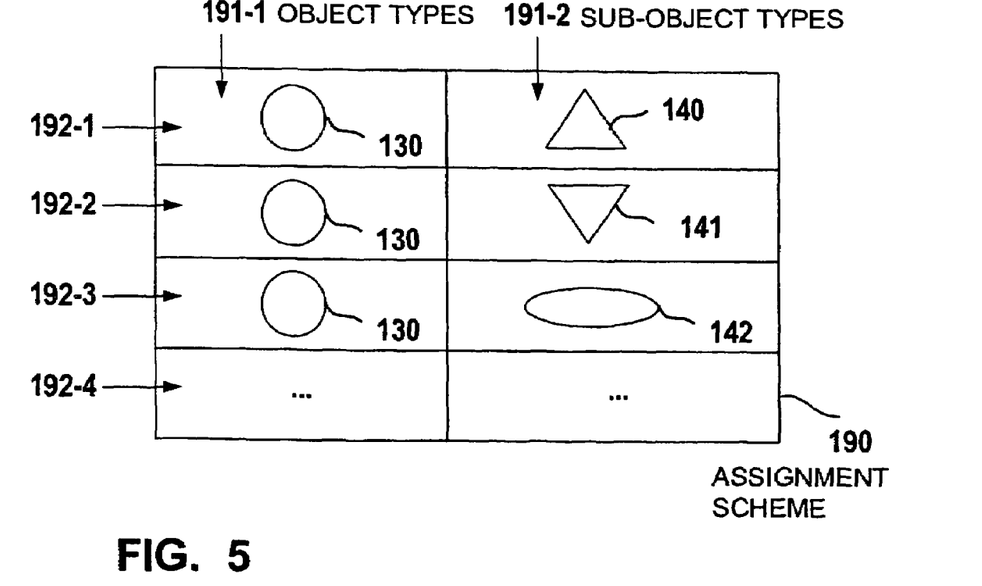
FIG. 5 illustrates an assignment scheme with "sub-object type to object type" assignments.

FIG. 5 illustrates assignment scheme 190 with "sub-object type to object type" assignments 192-1 to 192-4.

An object type 130 comprises a specific subset of sub-object types 140-142. For example, a purchasing document object type comprises sub-object types for product data (e.g., 140 up-triangle), business partner (e.g., 141 down-triangle) and notes (e.g., 142 ellipse) Therefore, assignment scheme 190 defines assignments 192-1 to 192-3 of sub-object types 140-142 in column 191-2 to object type 130 in column 191-1. Further assignments 192-4 can be defined for any object type. However, an accounting voucher object type would not comprise a sub-object type for product data. New object types can be created by composing new subsets of sub-object types and assigning the new sub-sets to a new object type. An advantage is a high flexibility for data structures of objects (documents) through the combination of re-usable predefined data structures of sub-objects.

Figure 6:
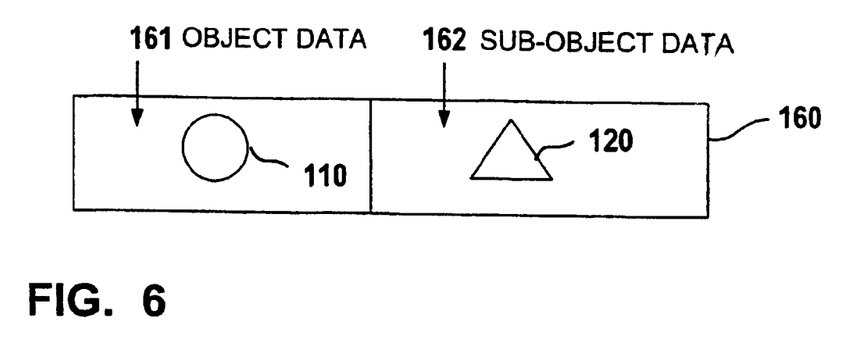
FIG. 6 illustrates archiving data for an object; according to an exemplary implementation of the present invention.

FIG. 6 illustrates archiving data 160 for object 110 according to an exemplary implementation of the present invention.

Data 160 include first portion 161 for object 110 and second portion 162 for all sub-objects (e.g. 120) that are archived together with object 110. The sub-objects in second portion 162 are identified according to the identifying step 430 (cf. FIG. 2). Preferably, data 160 comprise multiple data sets for all objects that are archived from application computer 900.

After having described the present invention as computer-implemented methods 400, 500, it will now be described as computer system.

FIG. 7 illustrates an exemplary implementation of an inventive application computer 900 with an exemplary implementation of an inventive archiving computer 901. In a preferred embodiment of the present invention, the two inventive computer systems 900, 901 are part of inventive computer network system 999 (cf. FIG. 1). For convenience of explanation, hardware components are shown with dashed lines and software components with solid lines.

Preferably, application computer 900 comprises memory 920 that supplies 410 (cf. FIG. 2) a plurality of objects 110, 111, 112 (cf. FIG. 4) for archiving. Object 110 has object type 130 (cf. FIGS. 4,5) and has at least one sub-object 120 (cf. FIG. 4). Memory 920 further provides 420 (cf. FIG. 2) assignment scheme 190 that assigns a plurality of sub-object types 140, 141, 142 (cf. FIG. 5) to object type 130.

Application computer 900 may further comprise identifier 100-1 for identifying 430 (cf FIG. 2) the at least one sub-object 120 for archiving with object 110. Preferably, identifier 100-1 is implemented in computer program product 100 according to the identifying step 430 that is described in detail under FIG. 2.

Optionally, application computer 900 further comprises archiver 100-2. Preferably, archiver 100-2 is implemented in computer program product 100 according to the archiving step 440 that is described in detail under FIG. 2.

Preferably, inventive archiving computer 901 comprises interface 990-1 to receive 510 (cf. FIG. 3) data 160 from application computer 900 via network 990. Data 160 comprise first portion 161 and second portion 162. The purpose of first and second portions 161, 162 is explained in detail under FIG. 6. Preferably, archiving computer 901 further comprises memory 921 for archiving 520 data 160. Preferably, memory 921 is a database, such as a relational database, where data 160 are stored.

After having described the present invention as computer-implemented methods 400, 500 and computer systems 900, 901, it will now be described as computer program products 100/101 that can be stored on computer readable data carriers 970/971, respectively.

Preferably, first computer program product 100 (cf. FIG. 7) has a plurality of instructions for causing processor 910 of application computer 900 to identify objects for archiving. Computer program product 100 may cause application computer 900 to execute the steps of method 400 (cf. FIG. 2).

Preferably, second computer program product 101 has a plurality of instructions for causing a processor 911 of archiving computer 901 (cf. FIG. 7) to archive objects. Second computer program product 101 causes archiving computer 901 to execute the steps of method 500 (cf. FIG. 3).

| Reference | Description |
| --- | --- |
| 100/101 | computer program products |
| 100-1 | identifier |
| 100-2 | archiver |
| 110-112 | objects |
| 120 | sub-object |
| 130 | object type |
| 140-142 | sub-object types |
| 160 | archiving data |
| 161, 162 | portions of archiving data |
| 190 | assignment scheme |
| 191-1, 191-2 | columns of assignment scheme |
| 192-1 to 192-4 | assignments |
| 400/500 | methods |
| 4xx/5xx | method steps |
| 999 | computer network system |
| 900, 901, 902 | computers |
| 910, 911, 912 | processors |
| 920, 921, 922 | memories |
| 930 | bus |
| 940 | input device |
| 950 | output device |
| 960 | user interface |
| 970, 971 | data carriers |
| 980 | program signal |
| 990 | network |
| 990-1 | interface |

Reference Numbers

The invention claimed is:

1. A computer-implemented method for identifying objects for archiving, the method comprising the steps of:

supplying a plurality of objects for archiving, wherein an object has an object type and includes at least one sub-object having a first sub-object type;

providing an assignment scheme that assigns a plurality of sub-object types to the object type;

determining the sub-object type of the at least one sub-object of the object;

identifying the at least one sub-object of the object for archiving with the object and at least a second sub-object of the object having a second sub-object type for not archiving with the object, based on the assignment scheme and one or more archiving attributes associated with the assignment scheme, and based on a determination using the assignment scheme that the determined sub-object type is assigned to the object type of the object;

based on the identification, archiving in a computer system the at least one sub-object with the object;

changing the assignment scheme so that the second sub-object type is assigned to the object type; and based on the changed assignment scheme, subsequently archiving in the computer system a third sub-object having the second sub-object type with an object having the object type.

2. A method for archiving objects, the method comprising the steps of:

receiving data for archiving, wherein the data comprise a first portion for an object having an object type and a second portion for at least one sub-object of the object, the at least one sub-object having a sub-object type, the at least one sub-object type being assigned to the object type, wherein the assignment is identified by an assignment scheme that assigns the sub-object type to the object type, respectively;

comparing the object type and the at least one sub-object type of the received data with the object type and sub-object type of the assignment scheme;

if the object type of the received data matches the object type of the assignment scheme, the sub-object type of the received data matches the sub-object type of the assignment scheme, and one or more archiving attributes associated with the assignment scheme indicate that sub-objects having the sub-object type should be archived with objects having the object type, archiving the data in a computer system;

changing the assignment scheme so that a second sub-object type is assigned to the object type; and based on the changed assignment scheme, archiving in the computer system additional data, the additional data including an additional object having the object type, a first sub-object of the additional object, and a second sub-object of the additional object, the first sub-object having the first sub-object type and the second sub-object having the second sub-object type with an object having the object type.

3. A computer system for archiving objects, the computer system comprising:

an application computer including a first memory, the first memory supplying a plurality of objects for archiving, wherein an object has an object type and includes at least a first sub-object having a first sub-object type and a second sub-object having a second sub-object type, the first memory providing an assignment scheme that assigns a plurality of sub-object types, including the first sub-object type, to the object type, and does not assign the second sub-object type to the object type, the application computer further including an identifier for identifying the first sub-object for archiving with the object; and an archiving computer including a second memory for archiving the first sub-object of the object with the object, based on a determination that the first sub-object type of the sub-object is assigned to the object type of the object according to the assignment scheme and based on one or more archiving attributes associated with the assignment scheme, wherein the computer system permits the assignment scheme and the one or more archiving attributes associated with the assignment scheme to be changed, such that prior to the change, the second memory is configured to archive the first sub-object of the object but not the second sub-object of the object with object, but after the change, the second memory is configured to archive a third sub-object having the first sub-object type and a fourth sub-object having the second sub-object type with an object having the object type.

4. A computer system for identifying objects for archiving, the computer system comprising:

a memory that supplies a plurality of objects for archiving, wherein an object has an object type and includes at least a first sub-object of the object, the first sub-object having a first sub-object types and a second sub-object of the object, the second sub-object having a second sub-object type, the memory providing a first assignment scheme that assigns a plurality of sub-object types including the first sub-object type to the object type and does not assign the second sub-object type to the object type, wherein the computer system permits the first assignment scheme to be changed to a second assignment scheme, such that the second assignment scheme assigns a plurality of sub-object types including the first sub-object type to the object type and also assigns the second sub-object type to the object type;

a first identifier for identifying, based on the first object type of the first sub-object, the second object type of the second sub-object, the first assignment scheme, and one or more archiving attributes associated with the first assignment scheme, the first sub-object for archiving with the object and the second sub-object for not archiving with the object; and a second identifier for identifying, based on the first object type included in a third sub-object, the second object type included in a fourth sub-object, the second assignment scheme, and one or more archiving attributes associated with the second assignment scheme, the third sub-object and the fourth sub-object for archiving with an object having the object type.

5. The computer system of claim 4, wherein the first identifier is a flag that indicates that the first sub-object should be archived with the object, and further comprising:

an archiver for archiving the first sub-object indicated by the flag with the object.

6. A computer system for archiving objects, the computer system comprising:

an interface for receiving data for archiving from a further computer system, wherein the data comprise a first portion for an object having an object type and a second portion for at least one sub-object of the object, the sub-object having a sub-object type, the sub-object type being assigned to the object type, wherein the assignment is identified by an assignment scheme that assigns the sub-object type to the object type;

one or more processors for comparing the object type and the at least one sub-object type of the received data with the object type and sub-object type of the assignment scheme to determine whether the object type of the received data matches the object type of the assignment scheme, and whether the sub-object type of the received data matches the sub-object type of the assignment scheme; and a memory for archiving the data if the object type of the received data matches the object type of the assignment scheme and the sub-object type of the received data matches the sub-object type of the assignment scheme, and based on one or more archiving attributes associated with the assignment scheme, wherein the computer system permits the archiving attributes to be changed such that subsequent to the change, sub-objects having sub-object types that were previously not archived with objects having the object type are subsequently archived with objects having the object type.

7. A computer program product stored on a computer-readable storage medium, the computer program product comprising a plurality of instructions for causing a processor of a computer to identify objects for archiving, the computer program product causing the computer to execute the steps of:

supplying a plurality of objects for archiving, wherein an object has an object type and includes at least one sub-object having a first sub-object type;

providing an assignment scheme that assigns a plurality of sub-object types to the object type;

determining the sub-object type of the at least one sub-object;

identifying the at least one sub-object of the object for archiving with the object and at least a second sub-object of the object, the second sub-object having a second sub-object type for not archiving with the object, based on the assignment scheme and one or more archiving attributes associated with the assignment scheme, and based on a determination using the assignment scheme that the determined sub-object type is assigned to the object type of the object;

based on the identification, archiving in a computer system the at least one sub-object of the object with the object;

changing the assignment scheme so that the second sub-object type is assigned to the object type; and based on the changed assignment scheme, subsequently archiving a third sub-object having the second sub-object type with an object having the object type.

8. A computer program product stored on a computer-readable storage medium, the computer program product comprising a plurality of instructions for causing a processor of a computer to archive objects, the computer program product causing the computer to execute the steps of:

receiving data for archiving, wherein the data comprise a first portion for an object having an object type and a second portion for at least one sub-object of the object, the at least one sub-object having a sub-object type, the at least one sub-object type being assigned to the object type, wherein the assignment is identified by an assignment scheme that assigns the sub-object type to the object type, respectively;

comparing the object type and the at least one sub-object type of the received data with the object type and sub-object type of the assignment scheme;

if the object type of the received data matches the object type of the assignment scheme, the sub-object type of the received data matches the sub-object type of the assignment scheme, and one or more archiving attributes associated with the assignment scheme indicate that sub-objects having the sub-object type should be archived with objects having the object type, archiving the data in a computer system;

changing the assignment scheme so that a second sub-object type is assigned to the object type; and based on the changed assignment scheme, archiving additional data, the additional data including an additional object having the object type, a first sub-object of the additional object, and a second sub-object of the additional object, the first sub-object having the first sub-object type and the second sub-object having the second sub-object type.

9. A data carrier readable by a computer, the data carrier storing a plurality of instructions for causing a processor of the computer to identify objects for archiving, the plurality of instructions causing the computer to execute a method according to claim 1.

10. A data carrier readable by a computer; the data carrier storing a plurality of instructions for causing a processor of the computer to archive objects, the plurality of instructions causing the computer to execute a method according to claim 2.

11. A method of archiving data, comprising:

assigning at least one sub-object type to an object type according to an assignment scheme, the assignment scheme assigning one or more sub-object types to object types, and for each sub-object type assigned to an object type, assigning an archiving attribute to the sub-object type;

receiving an object having an object type and including a set of one or more sub-objects of the object, each of the one or more sub-objects having a sub-object type;

determining, by a computer system, the sub-object types of each sub-object of the set of one or more sub-objects of the object;

comparing the determined sub-object types to the at least one assigned sub-object type;

based on the comparison and based on the one or more archiving attributes associated with the assignment scheme, archiving the object with at least one sub-object from the set of one of more of the sub-objects;

changing the assignment scheme so that a second sub-object type is assigned to the object type; and based on the changed assignment scheme, archiving a sub-object having the first sub-object type and a sub-object having the second sub-object type with an object having the object type.

12. The computer system of claim 5, further comprising:

a flag that indicates at least a fifth sub-object that should not be archived with the object, the fifth sub-object including a sub-object type that is assigned to the object type of the object.

13. The method of claim 1, wherein the one or more archiving attributes include one or more flags that indicate that a first set of one or more sub-objects should be archived with the object.

14. The method of claim 13, wherein the one or more archiving attributes further include one or more flags that indicate that a second set of one or more sub-objects should not be archived with the object.

15. The computer system of claim 3, wherein the one or more archiving attributes include one or more flags that indicate that a first set of one or more sub-objects should be archived with the object.

16. The computer system of claim 15, wherein the one or more archiving attributes further include one or more flags that indicate that a second set of one or more sub-objects should not be archived with the object.

17. The computer program product of claim 7, wherein the one or more archiving attributes include one or more flags that indicate that a first set of one or more sub-objects should be archived with the object.

18. The computer program product of claim 17, wherein the one or more archiving attributes further include one or more flags that indicate that a second set of one or more sub-objects should not be archived with the object.

* * * * *

UNITED STATES PATENT AND TRADEMARK OFFICE
CERTIFICATE OF CORRECTION

PATENT NO. : 7,653,666 B2 Page 1 of 1
APPLICATION NO. : 10/486086
DATED : January 26, 2010
INVENTOR(S) : Brinkmoeller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Twenty-third Day of November, 2010

David J. Kappos
*Director of the United States Patent and Trademark Office*